Dec. 15, 1970 M. P. BORDONARO 3,548,317

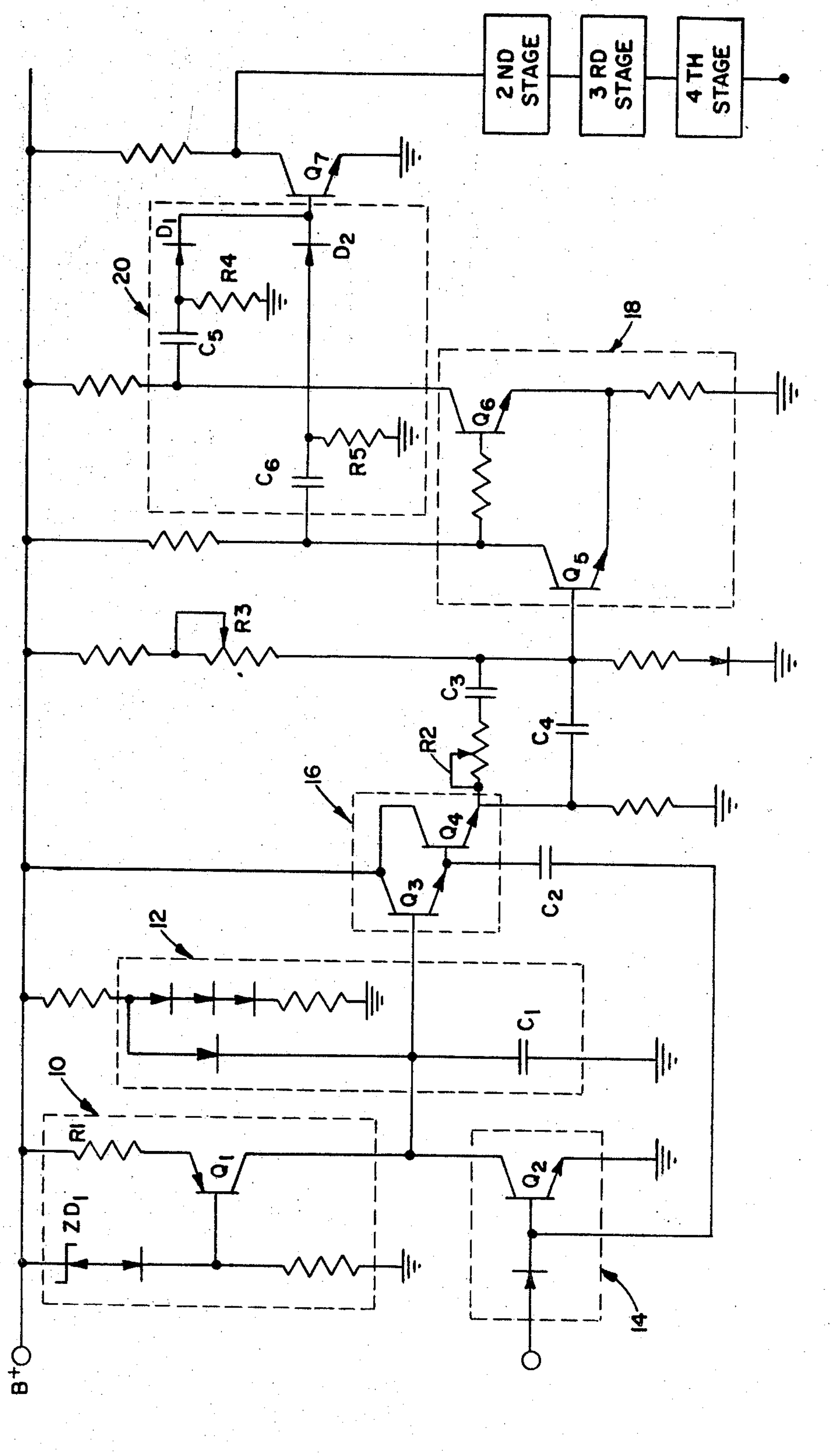
FIG. I

TIME DIVISION FREQENCY MULTIPLIER

Filed June 12, 1967 2 Sheets-Sheet 2

United States Patent Office 3,548,317
Patented Dec. 15, 1970

3,548,317

TIME DIVISION FREQUENCY MULTIPLIER

Michael P. Bordonaro, Middletown, Conn., assignor to Combustion Engineering, Inc., Windsor, Conn., a corporation of Delaware Filed June 12, 1967, Ser. No. 645,267
Int. Cl. H03b *19/00*
U.S. Cl. 328—20 5 Claims

ABSTRACT OF THE DISCLOSURE

A frequency multiplier with an input frequency which is variable over one decade and in which input pulses reset a linear ramp voltage to a negative voltage level from which a ramp voltage increases to a positive level. The ramp voltage is applied to a zero crossing detector which changes state each time the ramp voltage crosses the zero voltage level. Each time the zero crossing detector changes state an output pulse is provided at the output terminal, there being two such output pulses for each input pulse since the ramp voltage crosses zero during resetting of the ramp generator and as the ramp voltage builds up from its initial value.

BACKGROUND OF THE INVENTION

Field of the invention

The present invention relates to frequency multipliers. More particularly, this invention is directed to a frequency multiplier which operates on a time division principle. Accordingly, the general objects of the present invention are to provide new and improved apparatus of such character.

DESCRIPTION OF THE PRIOR ART

While not limited thereto in its utility, the present invention is particularly well suited for use in environments wherein a slow rotational speed is to be sensed. In the prior art, pulse counters have universally depended upon high counting rates to achieve accuracy with reasonable speed of response. Thus, prior art pulse counters were either designed with or inherently had a minimum operating frequency in the range of 30 cycles per second.

In many environments, it is necessary to accurately sense a rotational speed in a range of 1 to 15 revolutions per minute. Examples of such environments are coal feeders for boilers; disc, turbine and lobe flow meters for measuring fuel flow to a furnace; tachometers for sensing fan or pump speed and various other chemical process applications. The output pulse frequency from tachometer type apparatus employed on equipment with such slow rotational speeds is so low that the pulse to direct current converters associated therewith do not get sufficient signal frequency to operate with the required speed of response. Related, prior art combinations of tachometer generators and pulse to direct current converters will not operate satisfactorily with an input frequency of less than 30 cycles per second whereas the rotational speed of many types of equipment is such that the associated tachometer generator output frequency is considerably less than 30 cycles per second.

Thus, it may be seen that there is a need for circuitry which will multiply the frequency of applied alternating signals to increase the frequency of such signals to a usable level. Many frequency multiplication circuits have been proposed. These prior art frequency multipliers have, however, all shared a common deficiency. In the prior art, the available frequency multipliers have been unable to provide output pulse trains which could be used for averaging purposes over a range of input frequencies. As input frequency varied, the outputs of prior art frequency multipliers were characterized by bunching of pulses. With the output pulses bunched, the multiplied input signal obviously could not be averaged to provide, for example, a D.C. voltage proportional to frequency.

SUMMARY OF THE PRESENT INVENTION

In order to increase tachometer generator output frequency to a level where the associated pulse to direct current converters will get sufficient input signal frequency to operate properly, a time division frequency multiplier has been invented. This invention, which will be described more fully below, is operative over an input frequency range of one decade and comprises means responsive to input pulses for generating a linear ramp voltage. The ramp voltage is applied to a zero crossing detector which generates output signals indicative of the ramp voltage passing through the zero voltage level. Pulse shaping circuitry is operatively connected to the output of the zero crossing detector and provides an output pulse each time the ramp voltage crosses zero. The frequency multipier of the present invention thus provides a pair of output pulses for each input pulse and, through cascading a plurality of the circuits of the present invention, the input pulse frequency may be multiplied by any multiple of two.

BRIEF DESCRIPTION OF THE DRAWING

The present invention may be better understood and its numerous advantages will be apparent to those skilled in the art by reference to the accompanying drawing and the description thereof which follows. In the drawing:

FIG. 1 is a schematic diagram of a first stage of a preferred embodiment of the time division frequency multiplier in accordance with the present invention.

DESCRIPTION OF THE PREFERRED EMBODIMENT

Figure 2A:
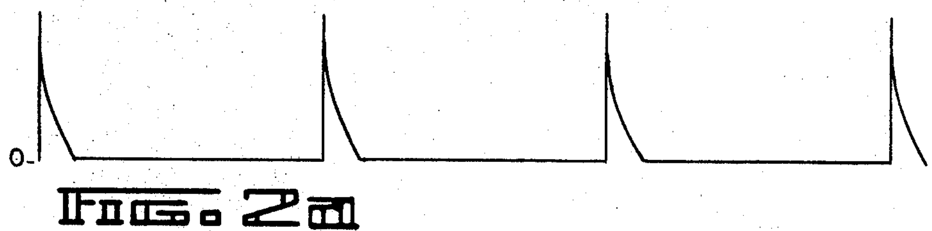
FIGS. 2*a* through 2*e* depict waveforms which will appear at various points in the circuit shown schematically in FIG. 1.

Referring now to FIG. 1, the major elements or subcircuits of the disclosed embodiment of the present invention are shown as enclosed within broken lines. These major elements include a constant current source 10 which is connected across a direct current supply, not shown. Constant current source 10 supplies charging current for a capacitor in a ramp voltage generator 12. Input pulses from a device such as a tachometer generator, not shown, are applied to a switch 14 which, as will be explained in greater detail below, provides a discharge path for the capacitor in the ramp voltage generator 12. The linear ramp voltage provided by ramp voltage generator 12 is delivered via a linear low frequency amplifier 16 to a zero crossing detector 18. Zero crossing detector 18 has a pair of outputs which are applied to a pulse shaping circuit 20. The output pulses from pulse shaping circuit 20 are summed and may be applied to a plurality of similar, cascade-connected additional multiplier stages.

Constant current source 10 is a series type current regulator which employs a transistor Q1 as the current source for charging the capacitor in pulse shaping circuit 12. Resistor R1 functions as the current measuring resistance whose voltage is applied to the emitter of Q1. The voltage from a reference Zener diode ZD1 is applied to the base of Q1 so that transistor Q1 is itself the comparison element. Accordingly, transistor Q1 attempts to pass a current which will keep the voltage across resistor R1 equal to the voltage across the Zener diode ZD1.

Ramp voltage generator 12 comprises a capacitor C1. Charging current for capacitor C1 is supplied by constant current source transistor Q1. Since capacitor C1 is charged from a constant current source, the voltage across the capacitor increases linearly with time. Restated, the voltage measured across capacitor C1 will be a linear saw tooth voltage. The diode network connected in parallel with capacitor C1 provides forward bias for the amplifier 16 and supplies leakage current for capacitor C1 thus aiding in the linearity of the ramp voltage.

Capacitor C1 is discharged via a transistor Q2 which functions as switch 14. Input pulses to the circuit are applied to the base of transistor Q2. Each positive input pulse causes transistor Q2 to conduct thereby providing a discharge path to ground for capacitor C1. Thus, each time a positive input pulse from a sensing device, such as a tachometer generator, is received, the ramp voltage will be reset to its minimum value.

The ramp voltage measured across capacitor C1 is applied to the base of transistor Q3 in linear, low frequency amplifier 16. In the embodiment disclosed, amplifier 16 is a direct coupled, cascaded emitter follower amplifier employing a pair of transistors, Q3 and Q4, connected in a Darlington circuit configuration. Use of a Darlington circuit results in transistors Q3 and Q4 not loading capacitor C1. A capacitor C2 provides current feedback from amplifier 16 to the base of switching transistor Q2. This current feedback establishes the discharge level for capacitor C1. That is, the current feedback to transistor Q2 has the effect of preventing capacitor C1 from discharging to ground potential and thus aids in the generation of a linear ramp voltage.

The output of amplifier 16, as measured at the emitter of transistor Q4, is applied to first plates of parallel connected ramp capacitors C3 and C4. The ramp voltage is applied to capacitor C3 via a potentiometer R2. Potentiometer R2 adjusts or trims the impedance of the parallel circuit comprising capacitors C3 and C4 and thus improves the linearity of the ramp voltage at low frequencies.

The other plates of capacitors C3 and C4 are connected to the input of zero crossing detector 18. Each input pulse to the circuit will result in the resetting of ramp capacitors C3 and C4 to a negative voltage proportional to the input frequency. This result is obtained because capacitors C3 and C4 convert the ramp voltage appearing at the emitter of transistor Q4 to an A.C. signal which has a minimum negative value. Restated, the capacitance associated with the coupling of the pulsating D.C. ramp voltage to the zero crossing detector 18 converts the ramp voltage to an A.C. signal with a zero crossing point midway up the ramp.

Connected between the input to zero crossing detector 18 and the power supply, and thus also connected to the ramp capacitors C3 and C4 is a second potentiometer R3. The setting of potentiometer R3 determines the maximum frequency at which the circuit of FIG. 1 may properly function. Potentiometer R3 establishes the firing point of the detector 18 by biasing an input transistor Q5 in detector 18. The bias setting is adjusted so that the detector 18 fires at a lower voltage with higher input frequencies. This is desirable because the amplitude of the ramp voltage decreases with frequency.

Zero crossing detector 18 consists of a pair of transistors, Q5 and Q6, connected in a Schmitt trigger circuit configuration. With no input signal to the system, transistor Q6 will be conductive and transistor Q5 will be cut off. When a ramp voltage appears at the base of transistor Q5, Q5 will abruptly turn on as the ramp voltage crosses the zero voltage reference level. The turning on of transistor Q5, in the manner well known in the art, causes transistor Q6 to abruptly turn off. When a second input pulse is applied to the system and causes the resetting of the ramp voltage, the voltage apppearing at the base of transistor Q5 will again pass through zero as it increases in a negative direction and thus Q5 will be turned off and Q6 will turn back on. Thus, each input pulse will cause resetting and then setting of the Schmitt trigger circuit and positive pulses will alternately appear at the collector electrodes of transistors Q6 and Q5.

The signals at the collector electrodes of transistors Q6 and Q5 are respectively applied to capacitors C5 and C6 in pulse shaping circuit 20. Capacitor C5 and its associated resistor R4 and capacitor C6 and its associated resistor R5 comprise a pair of short time constant differentiation circuits. The turning off of either of transistors Q5 and Q6 causes its collector voltage to suddenly increase and this increase in collector voltage is sensed by the differentiation circuits which provide short, negative going pulses to associated steering diodes D1 and D2. Thus, for each cycle of the ramp voltage, corresponding to a single input pulse, the Schmitt trigger will be reset and then set thereby causing pulse shaping circuit 20 to generate a pair of output pulses.

The output pulses from pulse shaping circuit 20 are delivered, via steering diodes D1 and D2, to the base electrode of a summing transistor Q7. Summing transistor Q7 may be coupled to a series connected second stage and will provide a pulse train consisting of double the number of input pulses to the second stage.

Figure 2B:
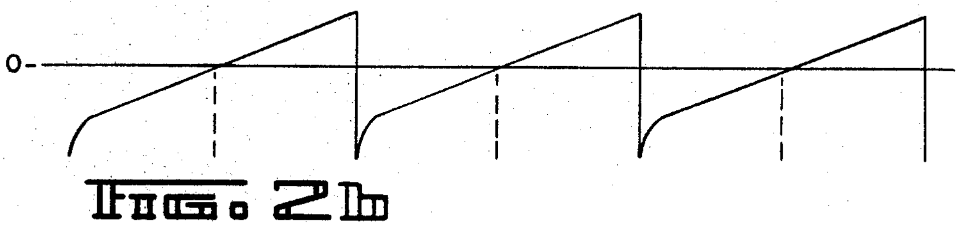
Figure 2C:
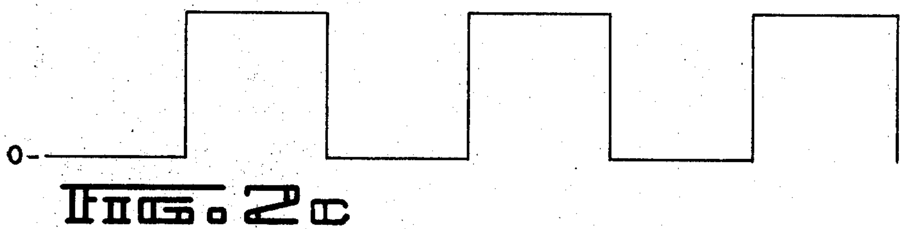
Figure 2D:
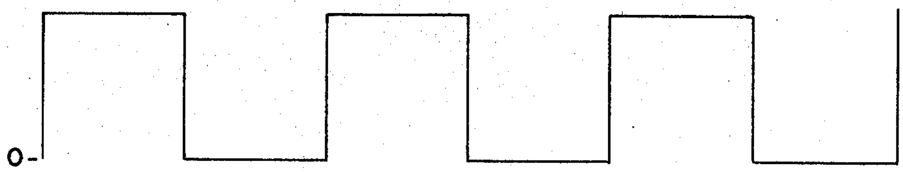
Figure 2E:
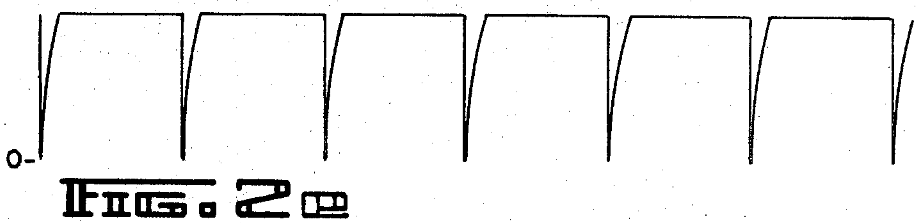

Referring now to FIG. 2, voltage waveforms which appear at various points in the circuit of FIG. 1 are shown. FIG. 2*a* represents the positive going input pulses which will be applied to switching transistor Q2 to cause discharge of capacitor C1. Once discharged, capacitor C1 will charge up linearly. The ramp voltage waveform of FIG. 2*b* appears at the input to zero crossing detector 18 (base of transistor Q5). FIGS. 2*c* and 2*d* illustrate the change of state of the Schmitt trigger; FIG. 2*c* representing the collector voltage of transistor Q6 and FIG. 2*d* representing the collector voltage of transistor Q5. As may be seen from a comparison of FIG. 2*b* with FIGS. 2*c* and 2*d* when the ramp voltage passes through the zero voltage level Q5 will abruptly turn on and Q6 abruptly turn off. When the trigger is reset by a second input pulse applied to switching transistor Q2, Q6 will be turned back on and Q5 abruptly turned off. As may be seen from FIG. 2*e*, a positive going change in the collector voltage of either of transistors Q5 or Q6, as occurs when the transistors are abruptly turned off, results in the generation of a pulse having a short width by the differentiation circuits. Two of such pulses are generated for input pulse to switching transistor Q2 and the output pulse train, as applied to the base of summing transistor Q7 by steering diodes D1 and D2, is shown in FIG. 2*e*. It should be noted that the input pulses to the second stage are negative whereas the first stage is responsive to positive pulses. Thus, if the second stage is identical to the first stage, the output of the first stage must be inverted. Alternately, and more desirably, the switching transistor Q2 in the second stage can be of the opposite conductivity type (PNP) when compared to NPN transistor Q2 of the first stage.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. A frequency multiplier circuit comprising:
- a capacitor;
- a low frequency amplifier having input and output terminals, said amplifier input terminal being connected to a first plate of said capacitor;
- diode means connected in parallel with said capacitor, said diode means providing forward bias for said low frequency amplifier and supplying leakage current for said capacitor;
- means for applying pulses to said first plate of said capacitor whereby a linear ramp voltage is generated;
- a zero crossing detector responsive to ramp voltages for generating output signals indicative of the ramp voltage passing through a zero voltage level;
- means connected between said amplifier output terminal and said zero crossing detector for coupling said ramp voltage from said capacitor to said detector, said coupling means establishing a zero voltage level at the input to said detector; and pulse shaping means responsive to said zero crossing detector output signals for generating a pulse each time said detector provides a zero crossing indication, there being two output pulses for each pulse applied to said capacitor.

2. The apparatus of claim 1 wherein said capacitive circuit means further comprises:

a constant current source, said current source being connected to said first plate of said capacitor; and normally open switch means connected in parallel with said capacitor, the input pulses to the frequency multiplier circuit being applied to said switch means and causing closing of said switch means thereby permitting discharge of said capacitor to a first potential of a first polarity, reopening of said switch means allowing said capacitor to recharge linearly to a second potential of said first polarity.

3. The apparatus of claim 1 further comprising:

feedback circuit means connected between said low frequency amplifier and the input to said normal open switch means, said feedback means coupling current from said amplifier to said switch means and causing said switch means to reopen before said capacitor can be completely discharged.

4. The apparatus of claim 1 wherein said zero crossing detector has a pair of output terminals and wherein said pulse shaping means comprises:

a pair of differentiator circuits, the input terminals of said differentiator circuits being connected to respective output terminals of said zero crossing detector.

5. The apparatus of claim 4 wherein said pulse shaping circuit further comprises:

means for summing the output pulses generated by said differentiator circuits, the output terminals of both of said differentiator circuits being coupled to the input of said summing means.

References Cited

UNITED STATES PATENTS

| | | | |
|---|---|---|---|
| 3,011,068 | 11/1961 | McVey | 328—183 |
| 3,333,205 | 7/1967 | Featherston | 328—77 |
| 3,364,866 | 1/1968 | Dryden | 328—185 |
| 3,262,069 | 7/1966 | Stella | 328—38X |
| 3,340,476 | 9/1967 | Thomas | 328—27 |
| 3,395,293 | 7/1968 | Perloff | 328—183X |
| 3,441,727 | 4/1969 | Vieth | 328—27 |

OTHER REFERENCES

Millman & Taub, Pulse, Digital and Switching Waveforms, 1965, pp. 527–531.

DONALD D. FORRER, Primary Examiner

J. D. FREW, Assistant Examiner

U.S. Cl. X.R.

328—225, 38, 183, 184, 185